United States Patent
Martinez et al.

(10) Patent No.: US 9,247,090 B2
(45) Date of Patent: Jan. 26, 2016

(54) PRINTING AND PRINTERS

(75) Inventors: Angel Martinez, Barcelona (ES);
Alejandro Campillo, San Diego, CA (US); Marc Serra, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1149 days.

(21) Appl. No.: 12/090,819

(22) PCT Filed: Oct. 20, 2005

(86) PCT No.: PCT/EP2005/055429
§ 371 (c)(1),
(2), (4) Date: Jul. 29, 2008

(87) PCT Pub. No.: WO2007/045277
PCT Pub. Date: Apr. 26, 2007

(65) Prior Publication Data
US 2008/0309959 A1  Dec. 18, 2008

(51) Int. Cl.
*H04N 1/405* (2006.01)
*H04N 1/00* (2006.01)
*H04N 1/32* (2006.01)

(52) U.S. Cl.
CPC ........ *H04N 1/00822* (2013.01); *H04N 1/00002* (2013.01); *H04N 1/32561* (2013.01); *H04N 2201/33328* (2013.01)

(58) Field of Classification Search
CPC ...... B41J 2/2132; B41J 19/142; B41J 11/008; B41J 2/0458; B41J 2/2103; B41J 2/2135; B41J 19/145; B41J 19/147; B41J 2/01; B41J 2/04551; B41J 2/04573; B41J 2/04586; G06K 15/105; G06K 15/1868; G06K 2215/0094; G06K 15/02; G06K 15/10; G06K 15/102; G06K 15/1805; H04N 1/6033; H04N 1/6055
USPC ......... 358/1.9, 2.1, 3.14–3.15, 462–464, 468, 358/406, 504; 382/173–180
See application file for complete search history.

(56) References Cited

U.S. PATENT DOCUMENTS

| 4,862,283 | A | | 8/1989 | Smith | |
|---|---|---|---|---|---|
| 5,678,133 | A | | 10/1997 | Siegel | |
| 5,742,704 | A | * | 4/1998 | Suzuki et al. | 382/176 |
| 5,852,678 | A | * | 12/1998 | Shiau et al. | 382/176 |
| 6,075,590 | A | | 6/2000 | Edgar | |

(Continued)

FOREIGN PATENT DOCUMENTS

| EP | 1001607 | 5/2000 |
|---|---|---|
| EP | 1263206 | 12/2002 |
| EP | 1307039 | 5/2003 |

*Primary Examiner* — Thomas D Lee
*Assistant Examiner* — Stephen M Brinich
(74) *Attorney, Agent, or Firm* — HP Inc. Patent Department

(57) ABSTRACT

A method of printing a document using one of a plurality of print modes, the method comprising:
(i) notionally dividing a digital image of the document into sectors;
(ii) for each sector, comparing one or more properties of the luminosity of pixels within each sector with one or more threshold values;
(iii) using the comparison of (ii) to determine whether each sector is likely to show an image defect if printed at a lower image quality print mode;
(iv) selecting a print mode such that all sectors are determined not to be likely to show an image defect;
(v) printing the document using the determined print mode.

8 Claims, 9 Drawing Sheets

(56) References Cited

U.S. PATENT DOCUMENTS 6,731,800 B1 * 5/2004 Barthel et al. ............... 382/176

2002/0071135 A1 6/2002 Takeda et al.
2003/0053140 A1 3/2003 Kakutani
2005/0190236 A1 9/2005 Ishimoto

* cited by examiner

PRINTING AND PRINTERS

RELATED APPLICATIONS

This patent application claims priority to application PCT/EP2005/055429, having title "PRINTING AND PRINTERS", filed on 20 Oct. 2005, commonly assigned herewith, and hereby incorporated by reference.

FIELD OF THE INVENTION

This invention relates to printing and printers.

BACKGROUND

Digital printers, such as inkjet, laser printers, dot matrix printers, LED printers, or gel printers, (to name a few) have been around for many years. They can be black and white or colour printers (e.g. four colour, or six colour, or more). They print onto a print medium, typically paper, cardboard, plastics, film or the like. Paper comes in different kinds with different colours and different ink-retention properties.

Inkjet printing is a non-impact printing process in which droplets of ink are deposited on a print medium in a particular order to form alphanumeric characters, area-fills, and other patterns. Low cost and high quality of the hardcopy output, combined with relatively noise-free operation, has made inkjet printers a popular alternative to other types of printers used with computers.

Inkjet printing involves the ejection of fine droplets of ink onto a print medium such as paper, transparency film, or textiles in response to electrical signals generated by a microprocessor. There are two basic means currently available for achieving ink droplet ejection in inkjet printing: thermally and piezoelectrically. In piezoelectric inkjet printing, the ink droplets are ejected due to the vibrations of piezoelectric crystals, again in response to electrical signals generated by the microprocessor.

In thermal inkjet printing, an inkjet image is formed when a precise pattern of dots is ejected from a drop generating device known as a "print head" onto a printing medium. The typical inkjet print head has an array of precisely formed nozzles (or ejector portions) attached to a thermal inkjet print head substrate, such as silicon, nickel, or polyamide, or a combination thereof. The substrate incorporates an array of firing chambers or drop ejector portions that receive liquid ink (colorants dissolved or dispersed in a solvent) through fluid communication with one or more ink reservoirs. Each firing has a film resistor, known as a "firing resistor" located opposite the nozzle so ink can collect between the firing resistor and the nozzle. The print head is mounted on a carriage that travels along the width of the printer (otherwise referred to as the "scan axis").

Digital printers have a number of "print modes" configured in them at the source of manufacture to set parameters and variables to ensure that a satisfactory print job is achieved. This can include ensuring that the correct ink load is applied when printing on a specific media, and that a required Image Quality (IQ) is produced. Other parameters that are defined by the print mode can include the number of passes of a printer head over a print medium, the dots per inch (dpi) that defines the number of dots of ink that are printed onto a page, or values in a Look-Up-Table (LUT) that define properties of ink composition for the printed page, for example how different coloured inks are mixed together to produce a desired colour.

Further parameters include the carriage speed and firing frequency of the print head. The carriage speed is measured in inches per second (ips), at which the printer carriage (and the print heads in it) move across the media. Typical carriage speeds range from 20 to 60 ips. The firing frequency is the number of drops fired per second. The higher the firing frequency, the higher the dot placement error of the drops on the media. High dot placement errors provoke undesired IQ defects (grain in area fills, blurred lines, etc.). Firing frequency is a parameter that is closely linked to the number of passes of the print mode (the higher the number of passes, the lower the firing frequency) and to the carriage speed (the higher the carriage speed the higher firing frequency of the pen).

The number of passes of the printer head over a print medium defines the number of times that the printer head passes over the same region of the document whilst applying ink to the medium. Each time a subsequent pass of the printer head is made, ink is applied on top of ink that has been applied in an earlier pass of the printer head.

Each print mode will have a different combination of values for the parameters that control aspects of the print operation. For example, one set of print modes may have constant values for all parameters except the number of passes, where each print mode defines a different number of passes of the print head that are performed during a print operation. There may also be other sets of print modes where the number of passes is kept constant and another parameter, for example dpi, is set at different values in each of the print modes within the set. Having a number of different print modes enables a user to select a print mode that strikes a balance between throughput of print jobs and image quality of the print job.

The wrong selection of the print mode can be two-fold. On one hand the user may select higher image quality print modes than needed. This causes a waste of time due to the slow throughput of print jobs associated with these print modes. This is because the printer takes a longer time to perform a print operation with a higher image quality print mode than a lower image quality print mode, as more ink is applied, and/or more passes of the printer head are typically performed, when performing a print operation with a higher image quality print mode.

On the other hand, if the user selects a lower image quality print mode than required, it is likely that the final printout will not meet the image quality expectations, especially due to a defect known as "banding" as will be discussed in more detail later.

In some cases a printed medium may have to be scrapped (thrown away) if it does not have a high enough image quality and the user will be forced to repeat the print job with an associated waste of money and time. Selection of the correct print mode helps to achieve optimal, or better, performance.

Some digital printers accommodate different kinds of paper/media by having a plurality of different print modes, different print modes being associated with specific types of media. Some printers can also have print modes associated with more than one print quality for each supported media, for example greyscale, normal and photo quality. For example, if there are three types of media supported and three print qualities available, the printer will have nine different print modes.

The user can select an appropriate print mode to be used for printing a particular print job with a particular printer from a group or set of pre-set possibilities in accordance with which media will be used and which print quality is required.

Typically users lack the knowledge and understanding to correctly select the optimal print mode for their particular needs. Moreover, the media portfolio can be very large and often confusing. Sometimes users choose not to spend the time necessary to select the correct print mode. This is a recognised usability issue.

A user may select the print mode that provides the best possible image quality in order to avoid the risk that an unacceptable image quality will be produced. Selecting an unnecessarily high print mode is inefficient and reduces the throughput of print jobs that could be achieved if the correct print mode were selected. Some print jobs can be printed faster, still with acceptable results, with a lower image quality print mode. Selecting an unnecessarily high image quality print mode further wastes ink and printing time, as ink is printed onto the medium that does not substantially improve the image quality, or improves the image quality to an unnecessarily high level.

Alternatively, a user may trial and error with different print modes to determine the most efficient print mode that provides them with an acceptable image quality. This also wastes time and ink during the trials, and also paper with associated cost and refuse disposal issues.

An unacceptable image quality can include an effect known as "banding". Banding occurs where an insufficient amount of ink has been printed onto the medium, and lighter colour bands are created across the image where there is a shortage of ink. Banding shows up as straight bands or lines that follow the direction of the printer carriage motion. Alternatively, banding may be caused where ink is printed onto incorrect regions of the medium, and some areas do not have the ink that they should have.

There are a number of causes of banding, and the most common cause of banding is where an incorrect print mode has been selected. The incorrect print mode causes too little ink to be printed onto the medium, or causes the ink to be printed onto the medium in too few passes of the print head over the medium (for example, in an inkjet printer, such as a thermal or piezoelectric inkjet printer).

It is easy to see banding in low pass print modes. High pass print modes can be very robust to this type of image quality defect.

Banding can also occur where a nozzle in a print head is blocked, where a nozzle is not aligned correctly and therefore does not fire the ink onto the correct region of the media, or the nozzle is otherwise not firing correctly. Whether or not banding occurs is also influenced by the accuracy/quality of the print medium, as this determines how much ink is required for the print medium to provide an acceptable image quality. For example, the porosity of the print medium, matte or glossy finish, or colour of the print medium can alter the desired print mode.

Although the invention is particularly concerned with inkjet printing, the invention may also find application with regard to other printing technologies, such as laser printing, LCD printing, LED printing, LEP gel printing, and/or toner-based printing (e.g. photocopiers), and other printers. The list above is not exhaustive.

According to a first aspect of the invention, there is provided a method of printing a document (100; 400) using one of a plurality of print modes, the method comprising:
(i) notionally dividing a digital image of the document (100; 400) into sectors (102, 202, 302; 402, 502);
(ii) for each sector (102, 202, 302; 402, 502), comparing one or more properties of the luminosity of pixels within each sector with one or more threshold values;
(iii) using the comparison of (ii) to determine whether each sector (102, 202, 302; 402, 502) is likely to show an image defect if printed at a lower image quality print mode;
(iv) selecting a print mode such that all sectors (102, 202, 302; 402, 502) are determined not to be likely to show an image defect;
(v) printing the document (100; 400) using the selected print mode.

Comparing a property of the luminosity of pixels within each sector may involve determining the mean value and/or standard deviation of the luminosity of the pixels and comparing it/them with one or more threshold values.

Thus a document can now be printed with an optimal print mode that has been determined dynamically and automatically, without a user's input, using information obtained from the document that is to be printed. This can avoid a user accidentally (or deliberately) selecting an inappropriate print mode for printing the document. Also, it is not necessary for a user to select any print mode: the printer/processor automatically selects a suitable print mode.

Another aspect of the invention relates to a printed document produced using the method of the first aspect of the invention.

According to another aspect of the invention, there is provided a printer system comprising a printer, computer memory having a plurality of print modes stored thereon, and printer driver software;
the system being configured such that the printer driver software is adapted to compare one or more properties of the luminosity of pixels within a document that is to be printed with one or more threshold values, and to select one of the plurality of print modes that is to be used to print the document based on the comparison.

According to a further aspect of the invention, there is provided printer control software which is adapted, when loaded on a processor associated with a printer, to compare at least one property of the luminosity of pixels in a document that is to be printed with at least one threshold value, and to select one of a plurality of print modes that is to be used when printing the document based on the comparison.

The software may be stored on a processor that is located on the printer, or may be located in an off-printer processor that is in communication with the printer.

According to another aspect of the invention, there is provided a printer system comprising means for printing, and means for data processing, the system being such that, in use, the means for processing compares a property of the luminosity of pixels within a document that is to be printed with a threshold value and determines an optimal print mode associated with the document, and the means for printing prints the document using the determined print mode.

According to a further aspect of the invention there is provided a method of calibrating a printer comprising analysing properties of a document that is to be printed, and calibrating printer settings based on the analysis.

According to a further aspect of the invention there is provided a method of printing a document using one of a plurality of print modes, the method comprising:
analysing a property of the luminosity of pixels within the document;
selecting an optimal print mode for printing the document from one of the plurality of print modes based on the analysis;
printing the document using the determined print mode.

According to a further aspect of the invention there is provided a method of reducing the likelihood of image quality defects in a printed document comprising:
notionally dividing the document into a grid of sectors;
comparing at least one property of the luminosity of pixels within each sector with at least one threshold value;

associating an individual optimal print mode associated with each sector based on the comparison for that sector;

determining an optimal print mode for the document as a whole based on the individual optimal print modes associated with each sector; and printing the document using the optimal print mode; wherein the optimal print mode provides a print job with reduced image quality defects when compared with a print job provided by other print modes.

According to a further aspect of the invention there is provided a method of selecting a print mode for printing a document comprising:

analysing at least one property of the luminosity of pixels within the document;

comparing the analysis of the at least one property of the luminosity of the pixels with at least one threshold value; and selecting a print mode for printing the document based on the result of the comparison.

According to a further embodiment of the invention, there is provided a method of printing a document (100; 400) using one of a plurality of print modes, the method comprising:

notionally dividing the document (100; 400) into sectors (102, 202, 302; 402, 502);

comparing one or more physical characteristics of pixels within each sector as they will appear in the printed document, with one or more threshold values;

determining one of the plurality of print modes as being the minimum print quality suitable for printing that sector based on the comparison of the physical characteristics of pixels for that sector;

determining the optimal print mode for the document based on the minimum print modes determined to be suitable for each sector; and printing the document using the determined optimal print mode.

BRIEF DESCRIPTION OF THE DRAWINGS

Various examples of the invention will now be described, by way of example only, with reference to the accompanying drawings in which.

DETAILED DESCRIPTION OF SOME EXAMPLES OF THE INVENTION

In use a printer is adapted to print indicia (e.g. words/text, pictures/drawings, photographs/representations of photographs, artwork, borders, lines, shapes or decorative features) onto a print medium, such as one or more sheets of paper. The term print medium used herein generally includes media such as card, plastic or other material sheet or film, transparencies, photographic paper, labels, iron-on transfer material, and matte paper/glossy paper, as a non-exhaustive list of examples.

It is to be appreciated that by the term 'printer' we intend to cover equipment that is capable of printing ink onto a print medium and accordingly includes equipment such as multiple-function machines (e.g. a combined printer, scanner and photocopier), fax machines and other open-media systems.

The term "ink" is meant to include liquid inks, gel inks and powder inks (e.g. toner that needs heat to fuse to a page/surface) and gels: it is not used in a sense to restrict its physical form. Ink marks an article to be printed and its application can be controlled by the printer.

A print operation can be considered as the physical act of applying ink to a medium in order to print indicia. A print job can be considered as the physical medium on which the indicia has been printed. The print job is produced by a print operation. In some embodiments, the print operation may also comprise a processor (on or off printer) sending electronic signals to a print head to cause the indicia to be printed. Furthermore, the print operation may include an off-printer processor receiving instructions from a user to print indicia, and sending an electronic signal to the printer to cause the indicia to be printed.

A number of print modes are available to the printer that control, amongst other things, the number of passes that the print head makes over the medium, and the amount of ink that is fired onto the medium in each pass of the print head.

Figure 1:
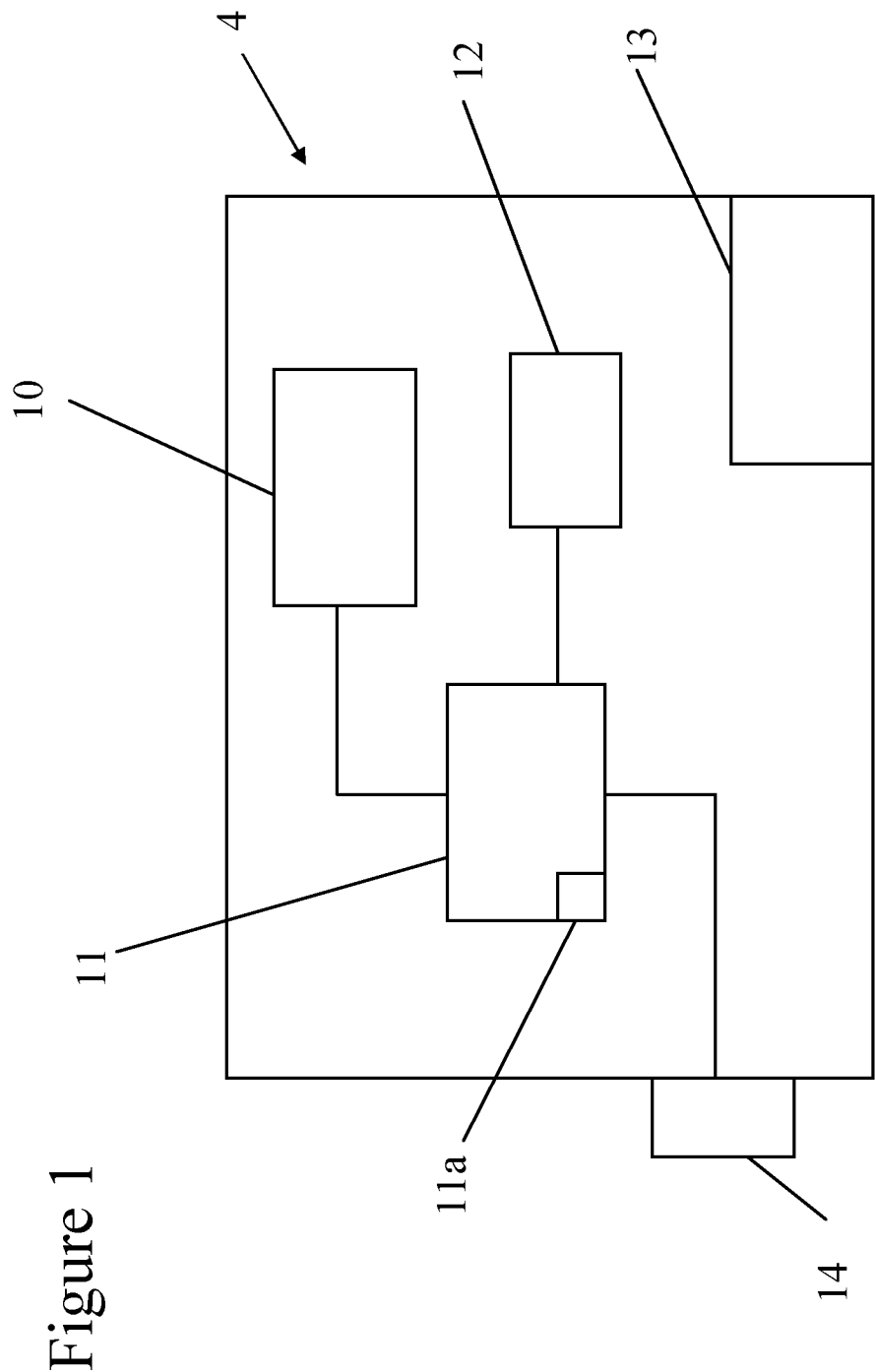
FIG. 1 shows a schematic representation of a printer according to an embodiment of the invention.

FIG. 1 shows an inkjet printer 4 according to an embodiment of the present invention comprising a printer head assembly shown generally at 10, a central processing unit 11, a memory 12 (which preferably comprises both re-writeable memory (e.g. RAM, EEPROM) and non-re-writeable memory (e.g. ROM)), at least one (or more) communications port 14, for example enabling connection to a PC, laptop, PDA or a network, and/or being adapted to receive a portable machine readable data carrier such as a memory card (e.g. Memory Stick™) USB storage devices, CDs, DVDs, flash memory cards. The printer 4 further comprises a paper tray 13 which stores a supply of paper to be printed on, and a paper feed assembly (not illustrated) to convey the paper from the paper tray 13 to the printer head assembly 10. Printer driver software 11a is stored on the central processing unit 11.

In the memory 12 of the printer 4 there are stored two print modes, a high image quality print mode that causes the print head 10 to perform 8 to 12 passes, in this embodiment 10 passes, over the print medium when performing a print operation and a low image quality print mode that causes the print head 10 to perform 4 to 6 passes, in this embodiment 5 passes, over the print medium when performing a print operation. These print modes cause a set amount of ink to be fired each time the print head 10 passes over the print medium. The print head 10 prints a certain amount of ink onto the paper during each pass over the print medium, therefore, the more passes that the printer head makes over the print medium, the more ink that is printed onto the print medium.

In some embodiments, a high image quality print mode can be considered as a slower, "banding-free", print mode, and a low image quality print mode can be considered as a "faster" print mode.

In other embodiments, there may be any number of print modes that define various qualities of print jobs. For example, there may be 3, 4, 5, or more print modes that define varying qualities of print job.

The print modes may define any number of passes of the printer head over the print medium, from 1 for a low image quality print mode up to 10, 12, 15, or more, or any number in-between, for a high image quality print job.

The print modes may also define varying amounts of ink that are fired during a pass of the print head. A low image quality print mode may cause a small amount of ink to be fired during a pass of the print head and a high image quality print mode may cause a large amount of ink to be fired during a pass of the print head.

In other embodiments, the print modes may be stored in an off-printer memory and may be accessible by the printer 4 via the communications port 14.

A low image quality print mode may consist of 4 to 6 passes of the print head over the print medium. A high image quality print mode may consist of 8 to 12 passes of the print head over the print medium. A low image quality print mode may be faster than a high quality image print mode, and also use less ink than a high image quality print mode. It will be appreciated that interim print modes, having interim numbers of passes of the print head over the print medium, may be selected for images that are determined to require an interim print mode.

In some embodiments a low image quality print mode, having say 6 passes of the print head over the print medium, may be capable of firing the same amount of ink as a high image quality print mode, having say 10 passes of the print head over the print medium. However, if analysis of the document that is to be printed determines that a high image quality print mode having 10 passes is required, but a low image quality print mode is used that has 6 passes, but fires the same amount of ink as the high image quality print mode having 10 passes, other defects in the printed image may occur. For example, some images may be susceptible to grain if too few passes of the print head over the print medium are made; grain occurs where colour within the image becomes grainy and does not look smooth as intended.

In some embodiments, a pen within the printer head can have a maximum amount of ink that it can fire in a single pass over the print medium, and if a print mode that has too few passes over the print medium is selected, it will not be possible to fire sufficient ink onto the print medium without image quality defects occurring.

When a user initiates a print job (e.g. by clicking on "print" on the display of their printer-connected computer) an instruction to print an image, and the electronic data representative of the image, is received via the communications port 14. The electronic data representative of the image is then stored in memory 12. Alternatively, electronic data representative of an image may already be stored in printer memory 12, and a user can select the image to be printed through a user interface (not shown) on the printer itself. It will be appreciated that an image is not limited to a graphical image or photograph, and may consist of any document that can be printed, including text, drawings, graphs, charts etc. or any combination thereof.

The printer driver software 11a is adapted to analyse the image that is to be printed, and to determine from that analysis an optimum print mode from the two print modes stored in memory 12 for printing the image. If the printer driver software 11a determines from the analysis that banding (or any other defect in image quality) is unlikely for the image, then the low image quality print mode is selected from memory 12. If the printer driver software 11a determines that banding (or any other defect in image quality) is likely for the image, then the high image quality print mode is selected from memory 12. A more detailed discussion of the analysis of an image is included below.

The analysis, includes, in some embodiments, an analysis of the digital image to be printed, prior to preparing the print job, to assess likely visual defects, and the probability of those defects occurring in the printed article, using physical parameters of parts of the image and tonal contrast between parts of the image.

The printer driver software 11a then instructs the printer head 10 to print the image using the selected print mode.

In some embodiments the printer driver can be considered to be intelligent, as it can dynamically and automatically select an optimal print mode to be used when performing a print job. The optimal print mode can be selected without the user's input, and can save paper, ink and time.

In some embodiments the printer driver software 11a may be stored in the memory 12 of the printer 4, and the central processing unit 11 causes the printer driver software 11a to be executed from memory 12.

In other embodiments the printer driver software 11a may be stored in an off-printer memory and/or executed by an off-printer processor that is in communication with the printer.

The print mode automatically selected by embodiments of the present invention can take into account image quality issues specific to the image to be printed that a user may not be aware of when selecting a print mode. For example banding, grain, etc.

Figure 2:
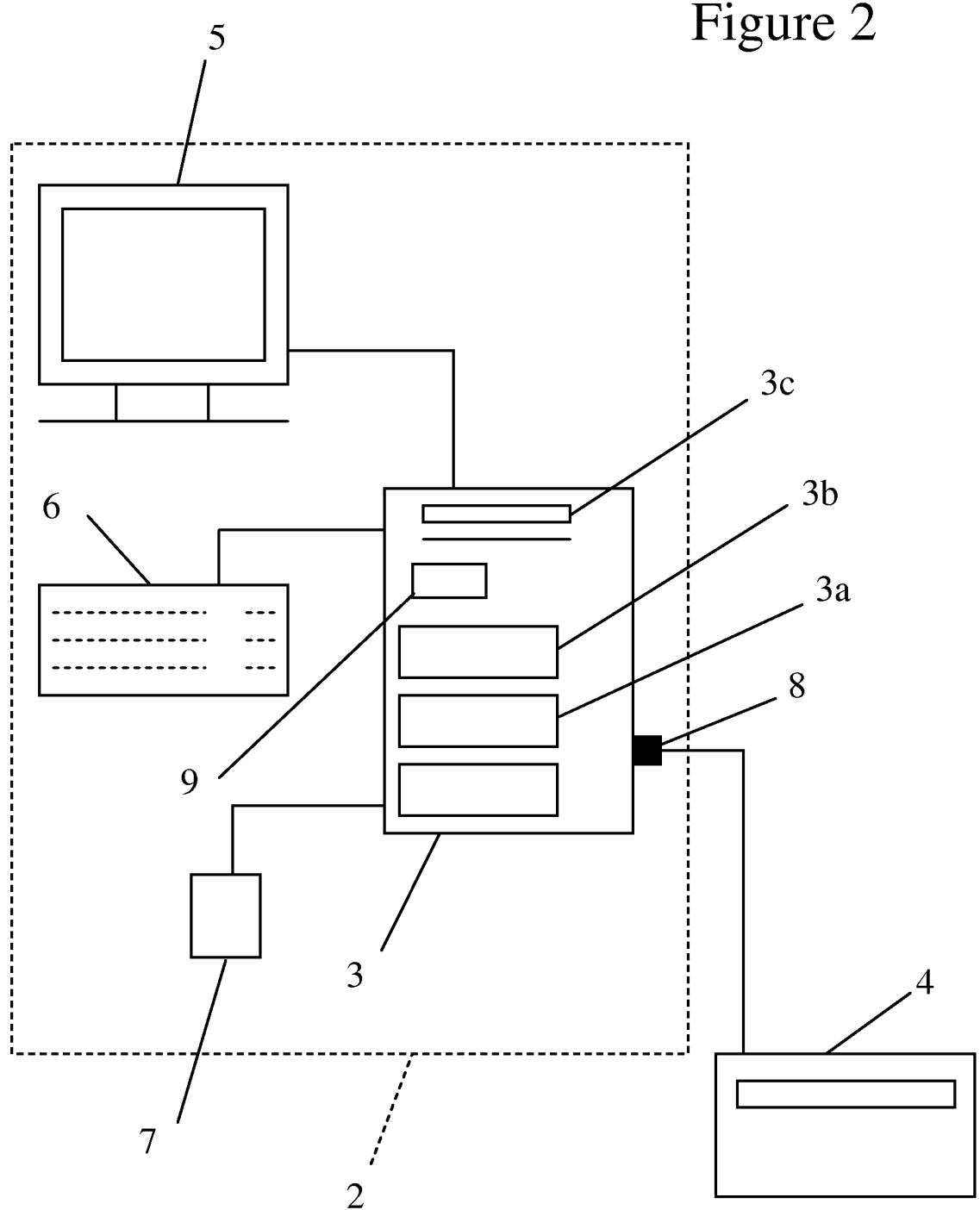
FIG. 2 shows a schematic representation of a system for printing a document according to an embodiment of the invention.

FIG. 2 shows a system for printing a document according to an embodiment of the present invention comprising a workstation 2 and a printer 4. The workstation 2 includes a personal computer (PC) 3 that is connected to the printer 4. The workstation 2 includes a user interface including a screen 5, a keyboard 6 and a mouse 7. The PC 3 has a processor 3a, a memory 3b, and I/O software devices 3c by means of which the processor communicates with the screen 5, the keyboard 6 and the mouse 7 and a communications port 8 by means of which it communicates with a network such as the Internet or a local network such as a LAN having peripheral devices and/or other computers (e.g. PCs), or a WAN, or a MAN, for example.

The PC 3 also comprises printer driver software 9 that allows the PC 3 to communicate with, and instruct, the printer 4. In other embodiments (for example the embodiment shown in FIG. 1) the printer driver software is located on the printer 4 itself, and not on the PC 3.

In use, a user uses the workstation 2 to design a document, or the user selects a pre-designed document that they desire to be printed. When the user selects a print option using the workstation, the printer driver software 9 prepares a print command to be sent to the printer to initiate the print job. The printer driver software 9 disregards a print mode that a user may have selected as part of the print option, or a default print mode set for the printer, and analyses the document that is to be printed to determine an optimum print mode for the specific document that is to be printed (and sets the print mode to be the auto-selected one).

In some embodiments a user can override a print mode that has been determined as optimal for the print operation. The user may be able to select a print mode that they desire to be used, and force the selected print mode to be used irrespective of which print mode is determined as optimal by the printer driver software.

In some embodiments, the optimum print mode may be determined for each individual page of the document, and each page of the document may be printed with a different print mode if it is determined optimal. In other embodiments, the optimum print mode may be selected for the document as a whole (e.g. multi-page document), and may involve selecting the print mode that is associated with the page that requires the highest image quality print mode in order to ensure that every page is printed with an acceptable image quality.

In some embodiments the printer driver software may be split between the PC 3 and the printer 4. Document analysis processing and/or optimal print mode selection processing may be split between, or shared across a processor on the PC 3 and a processor on the printer 4.

Figure 3:
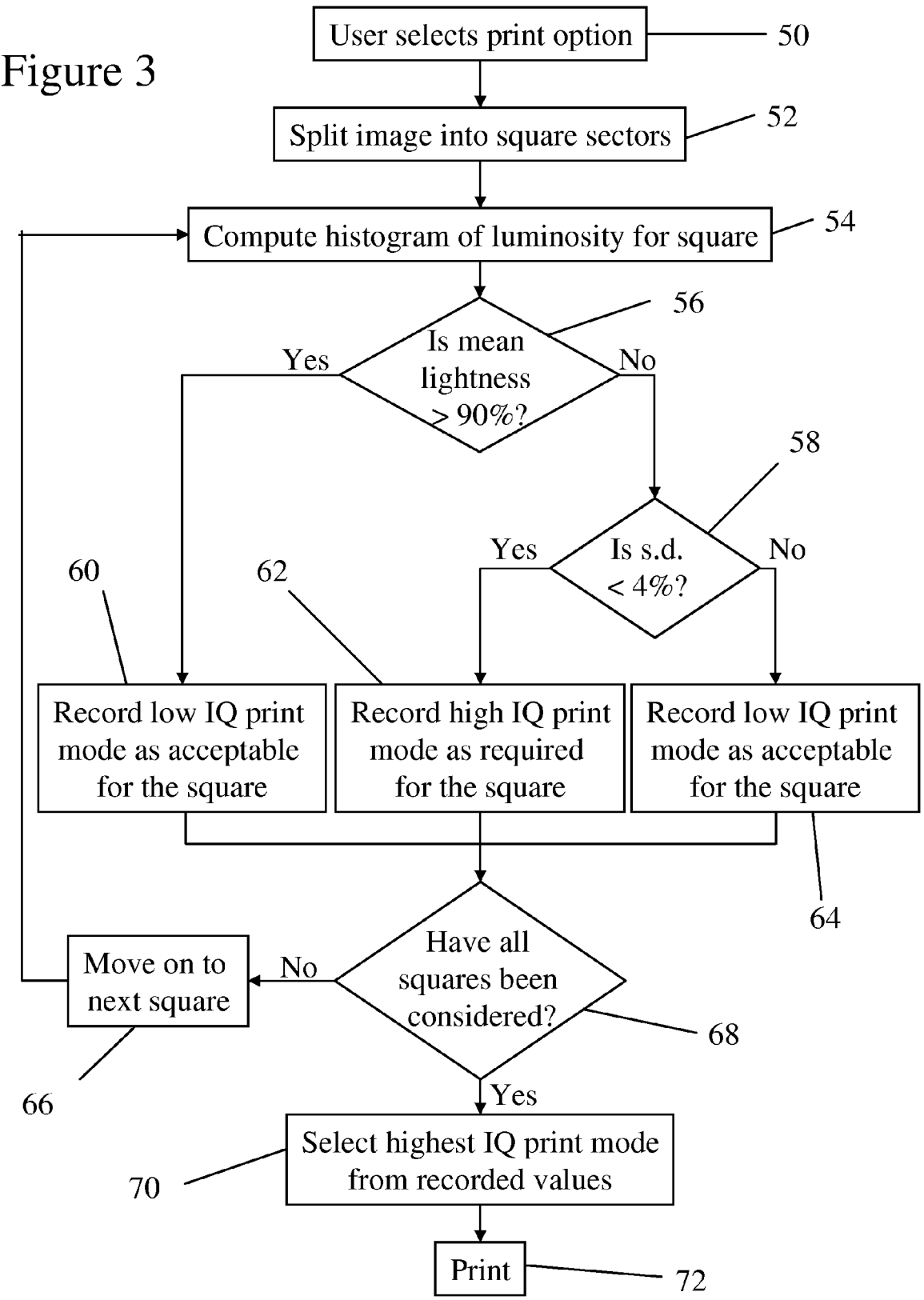
FIG. 3 shows a flow diagram of the steps carried out when printing an image according to an embodiment of the present invention.

FIG. 3 shows a flow diagram of the steps carried out when printing an image according to an embodiment of the present invention. At step 50, a user selects a print option to print an image. The user may have created the image themselves on a PC, or otherwise selected an image to be printed.

At step 52, the image is notionally divided into a grid of sectors, e.g. square sectors, that cover a large part of the image (and in many examples they cover the entire surface of the image). Each sector corresponds with a square sector of a known size in the physical printout, and the size of the sector is selected to correspond with a minimum area in the physical printout in which banding can be perceived by the human eye.

In some embodiments the size of the sector may correspond with square areas in the physical printout that are of the order of 2 cm by 2 cm, 1.5 cm by 1.5 cm, 1 cm by 1 cm, 0.5 cm by 0.5 cm, or any other dimension that can be set to define what the desired image quality for the print job should be. Alternatively, a user may define the size of the square sectors used.

The method then considers a first square sector at step 54. A histogram is computed of the lightness (or darkness) of the pixels, plotting the lightness of a pixel against the number of pixels (i.e. how many pixels of a particular shade of lightness/darkness there are in the sector in question).

The method determines the mean lightness of the pixels within the square sector, where 100% lightness is white, and 0% lightness is black. The method then evaluates whether or not the mean lightness of the pixels is greater than a threshold level of the maximum lightness at step 56. In this example the threshold level is 90% of the maximum lightness.

If the method determines that the mean value of the lightness of the pixels is greater than 90% (the threshold) of the maximum lightness, a low image quality print mode is recorded as being acceptable for the square sector at step 60. This is because there is little contrast between the printed region and the print medium (assuming that the print medium is lightly coloured itself) for an area that has been printed with light inks, and the human eye cannot perceive banding or other image quality defects in such lightly coloured regions.

Recording a print mode as being acceptable for a square sector may involve associating in computer memory, for example in a database, an identifier for the square sector with its associated acceptable print mode. In other embodiments an identifier may not be necessary, and the highest image quality print mode that has been recorded to date may be stored and be overwritten when a higher image quality print mode is recorded as being required for a square sector within the document to be printed (i.e. just keep the highest score to date). This way, the highest required image quality print mode remains in memory once all of the square sectors have been considered.

If the method determines that the mean lightness of the pixels in the square sector is less than the threshold (e.g. 90%) of the maximum lightness, the method determines that it is possible that banding may occur in the square sector, and the method moves on to evaluate the standard deviation of the lightness of the pixels in the square sector at step 58.

The sensitivity of the method to the percentage of lightness is closely linked to a number of parameters of the writing system of a printer. For example, number of inks used to print, type of colorants, media type, etc.

Development engineers can set a preferred threshold percentage of lightness during the development phase of the printer.

If the lightness threshold is too low, the method will not go on to evaluate the standard deviation of the lightness, and will use a low image quality (which may be low pass) print mode to print an area fill where banding would be visible. This could result in a printout with an unacceptable image quality for the user.

If the lightness threshold is too high, the method will unnecessarily evaluate the standard deviation of the lightness in an area fill with such a light-colour area fill that banding is not perceptible. This would provoke a loss of time in unnecessary algorithm calculations. However, in some embodiments, this loss of time may be preferable to a printout with unacceptable image quality (in the case of a too low luminosity threshold). An advantage to considering the mean lightness before the standard deviation is that considering the standard deviation can be avoided altogether if the mean lightness of the sector is so light that the standard deviation will not effect the image quality for the particular sector anyway. This can save processing power and time.

If the method determines at step 58 that the standard deviation of the lightness of the pixels is less than a second threshold (e.g. 4%) of the maximum lightness, the method records that a high image quality print mode is required for the sector, at step 62. This is because a sector with a low standard deviation has a low spread of pixels with different brightnesses. This means that the sector is relatively plain, without much detail, and banding is more likely to occur in a square with little detail.

If the method determines at step 58 that the standard deviation of the lightness of the pixels is greater than the second threshold, (e.g. 4%) of the maximum lightness, the method records that a low image quality print mode is acceptable for the square sector, at step 64. This is because a sector (square in this example) with a high standard deviation corresponds to a region of the image that has a lot of detail, as the pixels have varying degrees of lightness, and banding is less likely to occur. Also, the human eye will find it more difficult to perceive banding in a square with a lot of detail; that is with a high standard deviation.

Where a low image quality print mode is recorded as being acceptable for a square sector at steps 60 or 64, the quality of perceived visual image quality will not be substantially affected by whether a high image quality print mode or a low image quality print mode is used.

After a print mode has been recorded as being acceptable for the sector at one of steps 60, 62 or 64, the method determines whether or not all sectors of the image (squares in this example) have been considered at step 68.

If not all of the square sectors of the image have been considered, the method moves on to consider the next square that has not yet been considered at step 66, and the method returns to step 54 where the method computes a luminosity histogram for the new square.

If all of the square sectors of the image have been considered by the method, the method moves on to step 70 where it selects the highest image quality print mode that has been recorded for any of the squares that form part of the image. This may involve searching a database that associates each square sector with a required print mode for that individual square sector.

The highest image quality print mode is selected to ensure that all square sectors of the image are printed without the risk of banding occurring in any of the square sectors.

In other embodiments, the highest image quality print mode may not be selected if there is only one sector that requires a higher image quality print mode than the other sectors. It may be that a user is willing to risk an image defect in one sector in order to save printing time and ink for the print job as a whole.

In other embodiments, the highest image quality print mode may not be selected if only 1, 2, 3, 4, 5, 10, or any other number of sectors, or 1% 2%, 3%, 4%, 50% or 10%, or any other percentage of the total number of sectors, require a higher image quality print mode than the other sectors.

Alternatively, a low image quality (which may be low pass) print mode may be selected if a flat area fill is too small for banding to be perceivable in the area.

The image is then printed with the selected print mode at step 72.

In some embodiments, the method will stop analysing sectors and jump to step 72 to print the document, as soon as the method determines that one sector requires a high (or the highest) image quality print mode. This is because a high image quality print mode will be required to print the whole document irrespective of what print modes are determined as required by other sectors. In further embodiments still, the method will jump to step 72 to print the document when a certain percentage of the sectors are determined to require a high image quality print mode. For example, the document may be printed when 1%, 2%, 3%, 5%, 10% or any other percentage of sectors are determined to require a high image quality print mode. These embodiments have the advantage that processing time and power are saved by avoiding unnecessary analysis that will not affect which print mode is determined as optimal.

It will be appreciated that in some embodiments, one or more different properties/statistical parameters relating to the pixels within a square sector may be considered/analysed—the method need not consider both mean lightness and standard deviation of lightness for the pixels: it might consider just one of them, or none of them. In some embodiments, properties that can be considered can include one, some, or all, of the mean, mode, median, range, standard deviation or any other statistical attribute of one, some, or all, of lightness, colour intensity, contrast or any other measure of physical characteristics of an image that is to be printed.

If more than one statistical parameter of the pixels are considered, this may give a more accurate determination of the optimal print mode for a given sector. Alternatively, in some embodiments it may be preferred to consider fewer statistical parameters of the pixels in order that computational time and processing power are saved. In some embodiments the consideration of one, two, or three statistical parameters of the pixels will enable a sufficiently accurate optimal print mode to be determined.

Figure 4:
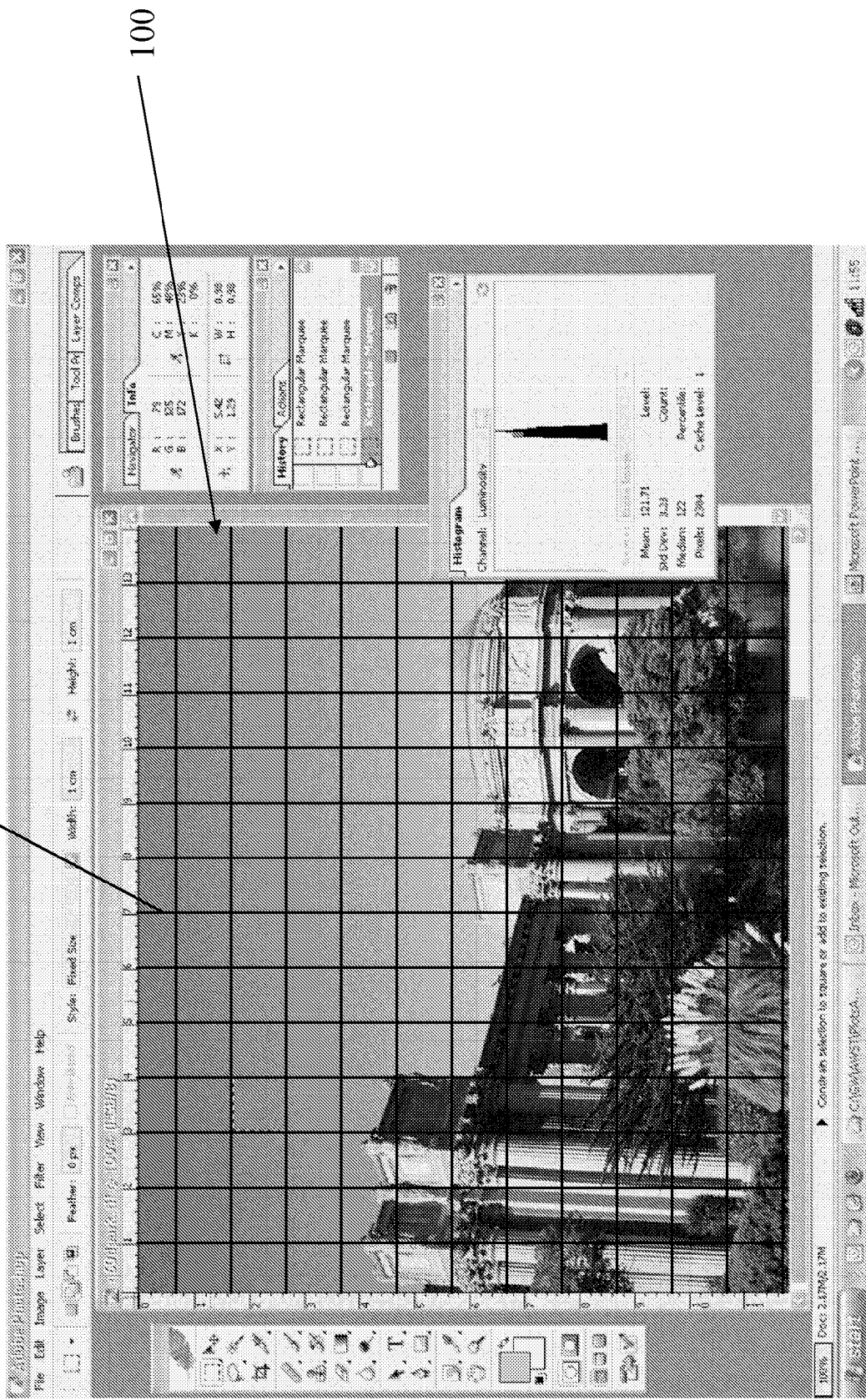
FIG. 4 illustrates a stage in the processing of an image to be printed according to an embodiment of the present invention.

FIG. 4 shows an example of an image 100 that is to be printed according to an embodiment of the present invention. FIG. 4 shows schematically how software is used to notionally divide the entire image 100 into square sectors using grid 101. Each square defined by grid 101 corresponds to a 1 cm by 1 cm region in the physical printout.

The size of the square sectors are selected so that they correspond with a minimum area in the physical printout in which banding can be perceived by the human eye. That is, if banding occurs in an area that is smaller than the square sector, it does not matter, as the human eye would not be able to see it. If the human eye cannot see the banding, then in some embodiments an acceptable image quality has been achieved.

In further embodiments still, the image may be considered as a whole, and the step of notionally dividing the image into sectors is not required (the image is equivalent to just one sector).

In some embodiments the software knows the location of blank areas or margins within the image, and the known areas of the image that consist of a margin or other blank space are not considered by the software, as banding and other image quality defects will not occur in blank areas of the page.

In some embodiments, the software analyzes all of the pixels in the digital image. If there are blank areas inside the image, or there are blank margins around the image, no more calculations will be done in these areas because the percentage of the luminosity will be higher than the threshold.

The size of the square sector 102 that is determined to provide an acceptable image quality may depend on the intended use of the printout of the image. For example, the size of the square sectors may be larger for an image that is to be displayed on a wall and viewed from a long distance away, than the size of the square sectors for an image that is to be viewed close-up.

In some embodiments there is an additional step in the flow chart illustrated in FIG. 3 between steps 50 and 52. The additional step requires a user to select the intended purpose of the printed document, and the method automatically selects the size of the sectors that are to be used in accordance with the intended purpose of the printed document. For example, if a user indicates that the document is to be used for in-depth analysis of a crime scene, the size of the sectors may be selected as a small square with sides of length 0.5 cm. Alternatively, if a user indicates that the document is to be used as a poster advertisement that will be displayed next to a road, the size of the sectors may be selected as a large square with sides of length 5 cm.

Figure 5:
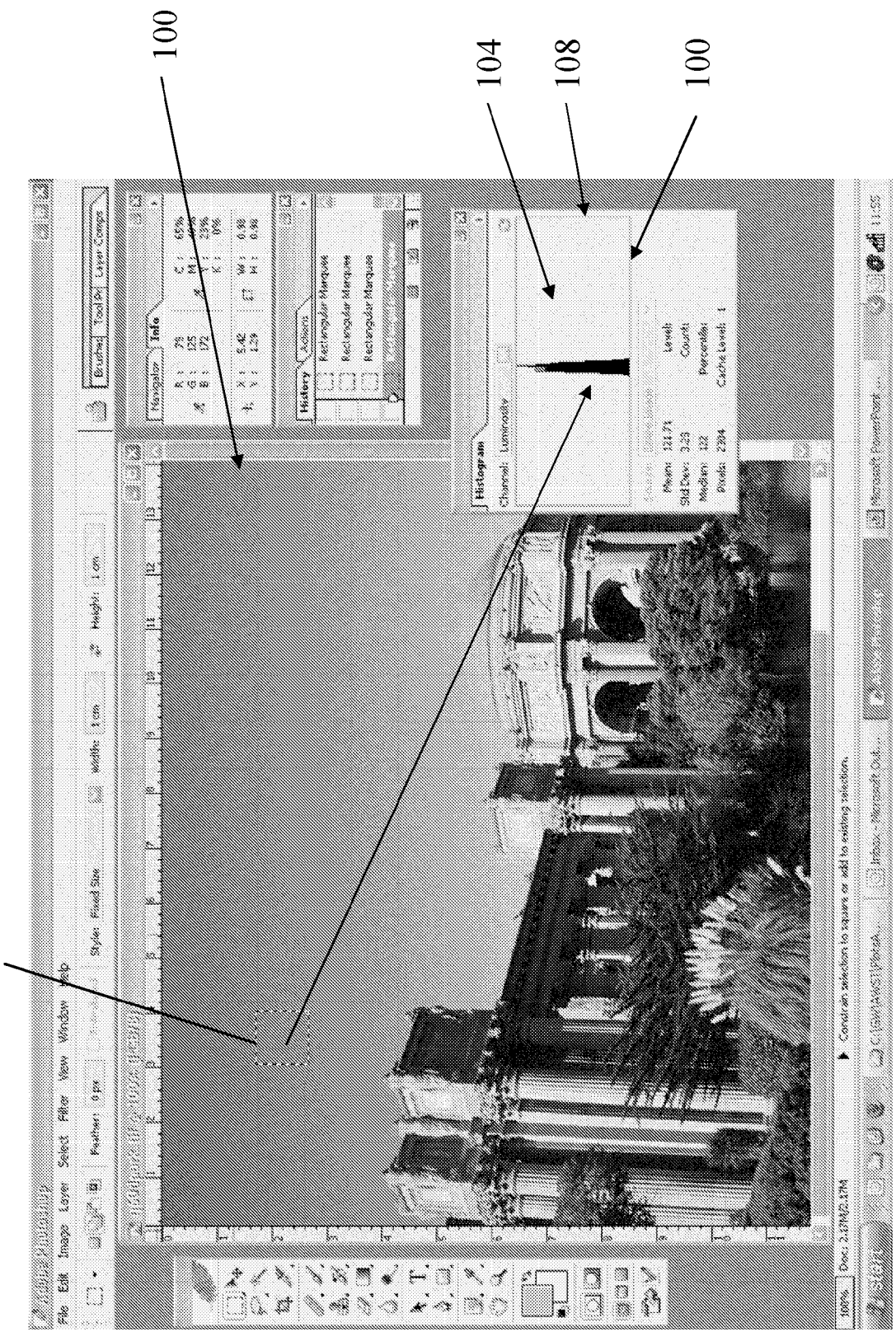
FIG. 5 illustrates a further stage in the processing of the image of FIG. 4 according to an embodiment of the present invention.

FIG. 5 shows the image 100 of FIG. 4 that is to be printed according to an embodiment of the present invention. Each of the square sectors shown in FIG. 4 are analysed to determine whether or not banding is likely to occur in that square. FIG. 5 illustrates an analysis of square sector 102.

In determining whether or not banding is likely to occur in a square, a histogram of the lightness/luminosity of the pixels within the square is computed. In FIG. 5, histogram 104 shows the lightness of the pixels within square 102. The horizontal axis 106 illustrates the luminosity of the pixels and has a range of 0 to 255, where 0 indicates complete darkness and 255 indicates white. The vertical axis 108 of the histogram 104 indicates a count of the number of pixels that have the lightness indicated by the horizontal axis.

The histogram 104 is then analysed to determine a mean value for the lightness of the pixels within the square sector 102. If the mean value of the lightness is greater than 90% (that is in the range of 230 to 255 on the scale of luminosity used in the histogram 104), the software determines that a low image quality print mode will be acceptable for the identified square sector, and a low image quality print mode is recorded for the square sector. The software then moves on to consider the next square sector.

A low image quality print mode is acceptable for a very light square sector as any banding present in a lightly coloured square will not be perceptible to the human eye. The contrast between the areas printed with light inks and the colour of the medium itself will not be sufficient to cause a reduction in the image quality as perceived by the human eye.

In the example shown in FIG. 5, the mean value of the lightness of square sector 102 is 121.71, which is less than 90% of 255 (complete lightness), therefore a low image quality print mode cannot be recorded as acceptable for this square at this stage.

It will be appreciated that the threshold of what constitutes a "light" square may be adjusted according to a user's preferences, and may be of the order of 70%, 80%, 85%, 95% or 100% complete lightness, any value in between, or any other value.

In some embodiments a user can set any threshold values manually using a graphical user interface or other input device, for example a mouse or a keyboard. In other embodiments a computer can set any threshold value based on its own image analysis.

If the software determines that the mean value of the lightness of the pixels in a square sector is less than 90% (or any other threshold value), the software can calculate and consider the standard deviation of the lightness of the pixels. The standard deviation provides an indication of the spread of the lightness values for the pixels within the square. A high standard deviation indicates pixels with a wide variation of different lightness values, and a low standard deviation indicates pixels with a narrow range of different lightness values.

In other embodiments, the standard deviation can be considered before the mean is considered. In some embodiments it does not matter which order the statistical parameters are considered in. In further embodiments still, the standard deviation and mean (and/or any other statistical parameter) can be considered at the same time in parallel.

If the standard deviation of the lightness of the pixels within a square is less than 4% (that is in the range of 0 to 10 on the scale of luminosity used in histogram 104), then the software determines that banding is likely to occur and a high image quality print mode is recorded for that square. If the software determines that the standard deviation of the pixels within the square is greater than 4%, then the software determines that banding is unlikely to occur and a low image quality print mode is recorded for the square sector.

Square sector 102 in FIG. 5 has a narrow lightness distribution of 3.23 as shown in histogram 104, and this causes a high image quality print mode, with typically 8 to 12 passes of the print head (in this example 10 passes), to be recorded as necessary for square sector 102 to avoid banding and other image quality defects.

Banding is more likely to occur where an image has plain, un-patterned regions when compared with images that have a lot of detail. The contrast of the lightness of the inks within a square sector reduces the chances of banding occurring (or being noticeable), and this is why a high image quality print mode is required for a plain image (that is one that has a low standard deviation, and hence low contrast in the lightness of the inks), and a low image quality print mode is acceptable for a patterned image (that is one with a high standard deviation, and hence a high contrast in the lightness of the inks).

It will be appreciated that the threshold for the standard deviation of what constitutes a "plain" square may be adjusted according to a user's preferences and may be of the order of 1%, 2%, 3%, 4%, 5%, 10%, any value in between, or any other value.

As with the threshold value for the luminosity, the threshold value for the standard deviation may be optimized for a given printer. A development engineer may set the threshold value during printer manufacture. This parameter may need to be optimized for a given combination of print heads, ink colorants, media type and other writing system parameters.

In some embodiments the threshold values for mean lightness and standard deviation may be optimized for the specific printer and/or print medium being used. The optimized values may be factory set: that is, set by an engineer when the printer is manufactured, or when software is installed onto the printer. Different printers may print documents in different ways that cause the printed document to be more or less susceptible to image quality defects such as banding.

The threshold values (percentage luminosity and/or standard deviation and/or any other characteristic of an image) can be set by performing a number of tests during the development process of the printer. From these tests it may be relatively easy to find the correct thresholds to select the most suitable print mode taking into account the media type in which the image is to be printed.

In some embodiments, a printer may self-learn which print modes are acceptable/suitable. For example, a user may indicate to the printer that a print job was unacceptable, and the printer may repeat the print job with a higher image quality print mode. In some embodiments, the printer may keep improving the image quality of the print mode until a user indicates that an acceptable image quality has been achieved. In some embodiments the printer will store in memory a print mode that achieved an acceptable image quality, so that a print mode that provides an acceptable image quality is used in future print operations.

Figure 6:
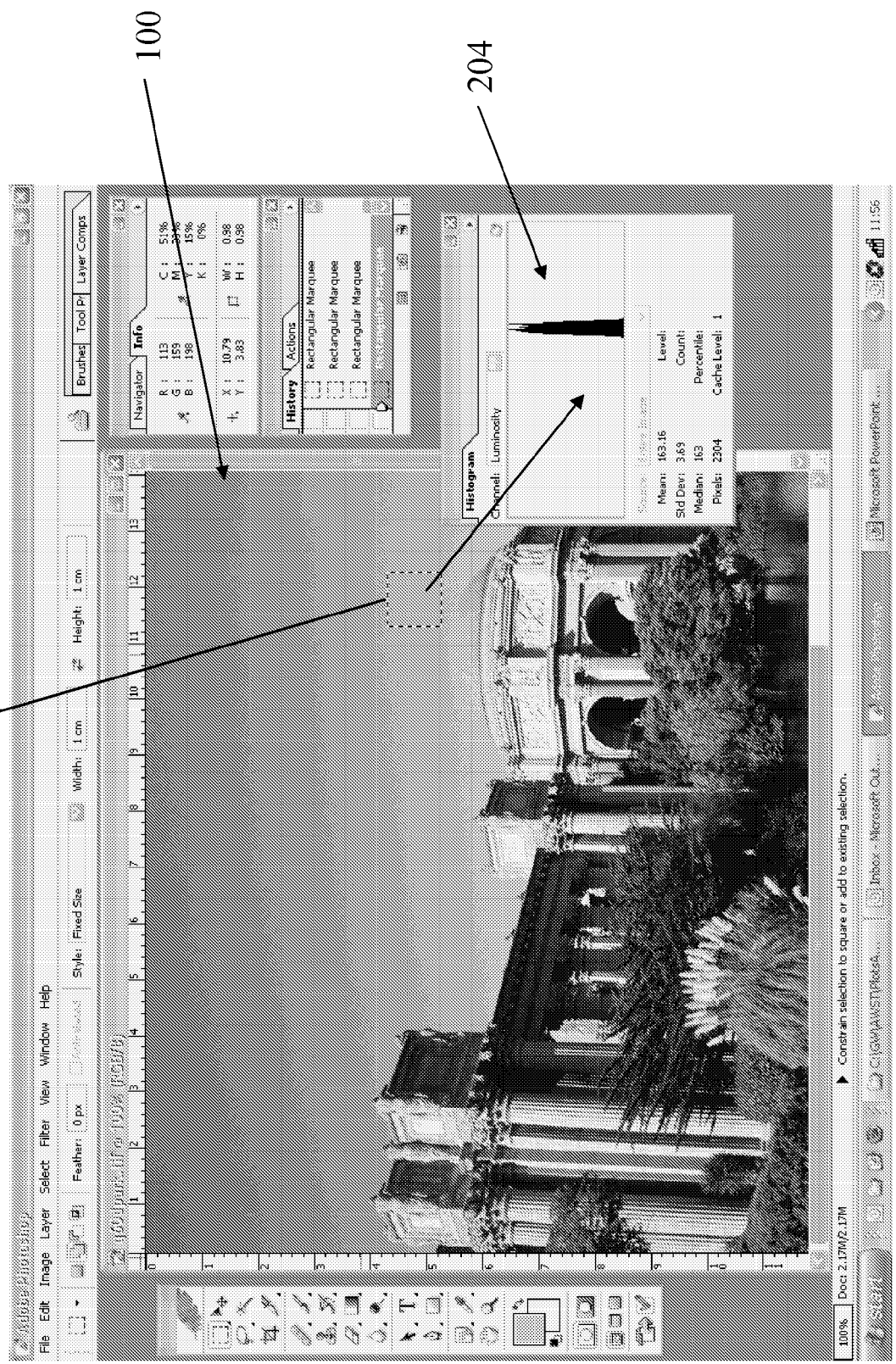
FIG. 6 illustrates a further stage in the processing of the image of FIG. 4 according to an embodiment of the present invention.

FIG. 6 shows the image 100 of FIG. 4, with an alternative square sector 202 to be analysed. The mean value of the lightness of the pixels within square sector 202 is shown as 163.16 in the histogram 204. In accordance with the threshold value of 90% (230 out of 255), this square sector 202 is not deemed to be light enough to warrant a low image quality print mode and the standard deviation of the lightness of the pixels is then considered by the software.

The standard deviation of the lightness of the pixels in square sector 202 is 3.69, and in accordance with the threshold value of 10 (that is 4%) is considered as a narrow lightness distribution. A high image quality print mode is recorded as being required for this square sector.

Figure 7:
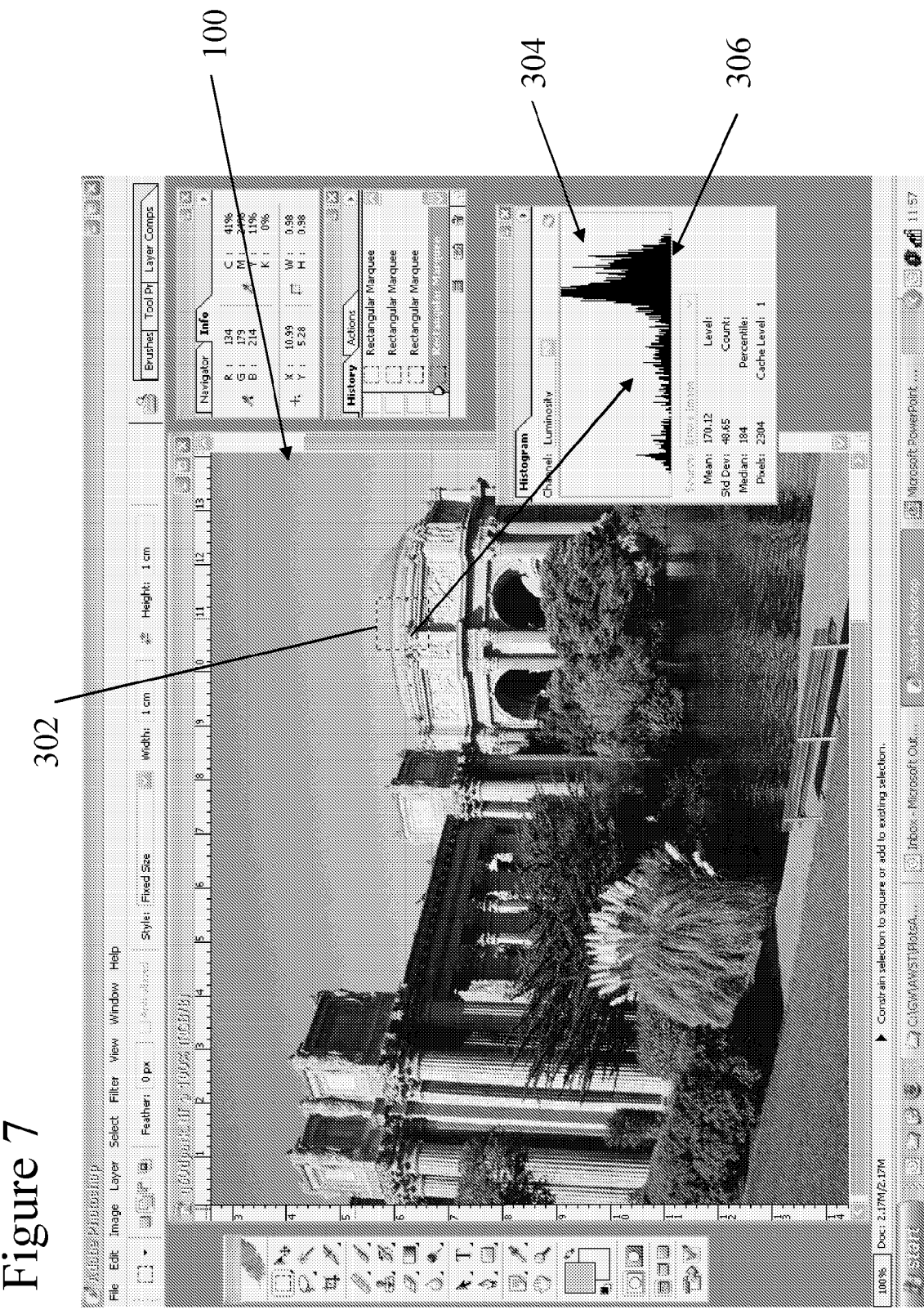
FIG. 7 illustrates a further stage in the processing of the image of FIG. 4 according to an embodiment of the present invention.

FIG. 7 shows the image of FIG. 4 with an alternative square sector 302 to be analysed. The square sector 302 defines a region of the image containing a part of a building. The square sectors 102, and 202 shown in FIGS. 5 and 6 respectively contained only regions of sky.

The histogram 304 shown in FIG. 7 indicates a mean value of 170.12 for the lightness of the pixels within the square sector 302. Again this is below the threshold of 230 as defined above, and the standard deviation of the lightness of the pixels is considered.

The standard deviation of the lightness of the pixels within square sector 302 is 48.65. This is greater than the threshold value of 10 and is considered as a wide lightness distribution. A low image quality print mode is recorded as being acceptable for this square sector 302.

FIGS. 5 to 7 show examples of three square sectors 102, 202, 302 that are analysed to determine the optimal print mode for each specific square sector 102, 202, 302. Once all of the square sectors for an image have been analysed, the software determines which square sector within the entire image requires the highest image quality print mode. The software then configures the print mode that is to be used to print the entire image as the highest image quality print mode that has been determined as necessary for any individual square sector. This ensures that the entire image is printed without the risk of banding, or any other image quality defect, occurring.

The image 100 is then printed with the highest image quality print mode that has been determined as necessary.

In other embodiments, a correlation of which square sector requires which print mode is not stored in memory, as in some embodiments the software does not care which square sector requires the highest image quality print mode. The software only needs information on what the highest image quality print mode required is, and not which sector it corresponds to.

In some embodiments it is necessary to divide the document into sectors/zones. If the document was not divided into zones and the standard deviation of the luminosity histogram was performed on all the pixels of the image, only images with a single flat colour area fill would be considered susceptible to banding.

In the image shown in FIG. 4, there are regions of plain sky and regions of grass having a significant amount of detail. If the histogram of the whole image were considered, the standard deviation of the luminosity would be quite high (there is a wide variety of colours and tones in the image). This would mean that the image as a whole is not sensitive to banding and a low image quality (which may have a low number of passes) print mode would be selected. There is, however, a particular area in the plot (plain sky) that needs to be printed in a high image quality (which may be have a high number of passes) print mode because it is very sensitive to banding. The detection of this type of area inside an image may only be possible if the image is split into zones, and each zone is independently analysed.

Figure 8:
FIG. 8 illustrates a stage in the processing of another image to be printed according to an embodiment of the present invention.

FIG. 8 shows an alternative image 400 that is to be printed according to an embodiment of the present invention. A first square sector 402 is considered, and the luminosity histogram 404 corresponding to square sector 402 is shown.

In this embodiment the threshold value for the mean lightness is 80% (204 out of 255), whereby a mean lightness value greater than 80% will be considered as being suitable for a low image quality print mode, and a mean lightness value of less than 80% will be considered as requiring a high image quality print mode. The threshold value for the standard deviation of the lightness of the pixels is 3% (8 out of 255). That is, a standard deviation of greater than 3% will be considered as suitable for a low image quality print mode, and a standard deviation of less than 3% will require a high image quality print mode.

Histogram 404 corresponds to square sector 402 shown in FIG. 8, and shows that the mean value of the lightness of the pixels within square 402 is 78.37, and the standard deviation is 22.88. In accordance with the above threshold values, the software determines that a low image quality print mode is acceptable for square sector 402 as there is a wide distribution of the lightness values of pixels within the square sector 402. When printing square sector 402, a faster print mode with 4 to 6 passes of the print head will provide the same image quality as a slower print mode with 8 to 12 passes of the print head.

Figure 9:
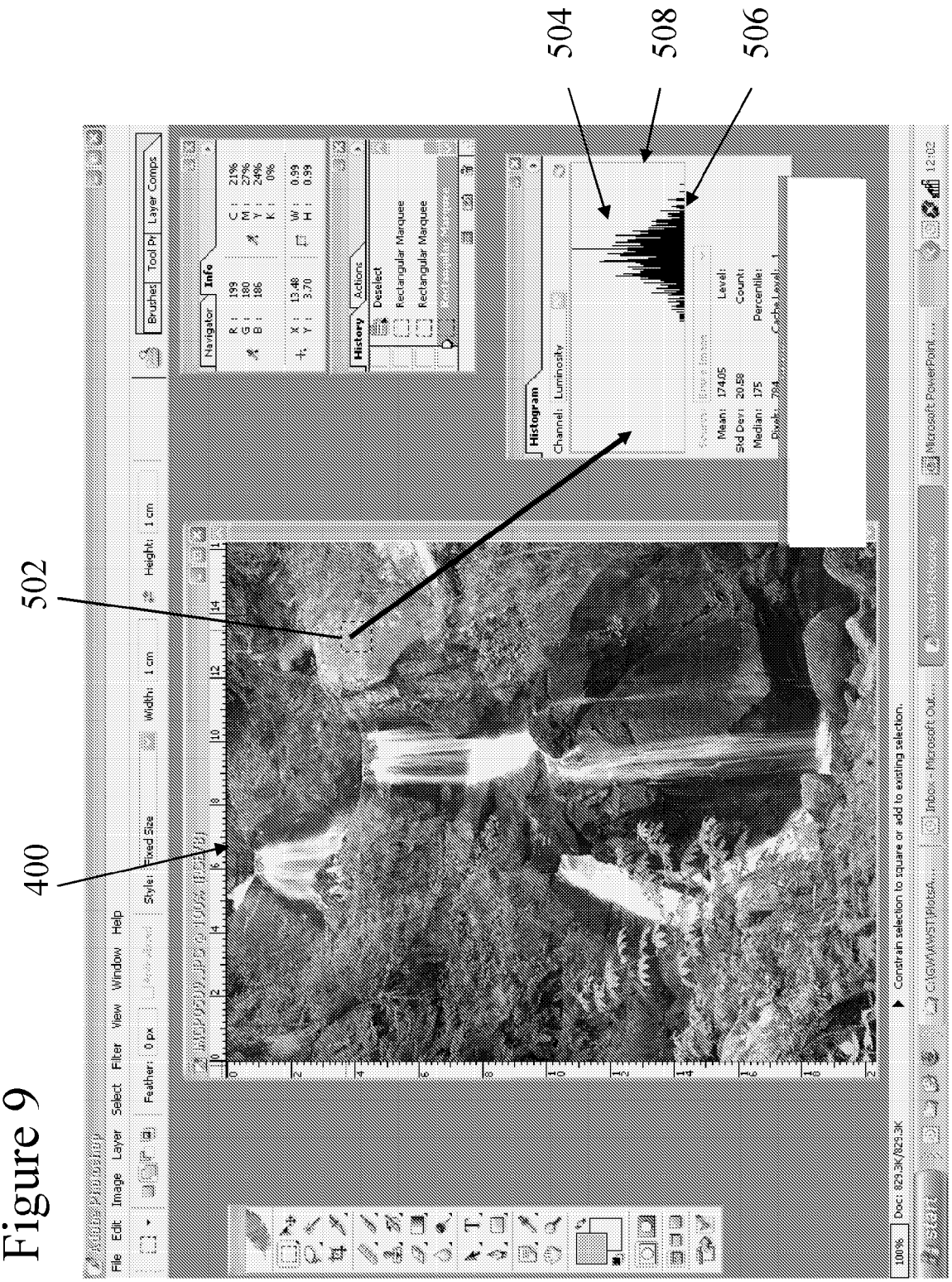
FIG. 9 illustrates a further stage in the processing of the image of FIG. 8 according to an embodiment of the present invention.

FIG. 9 shows the image 400 of FIG. 8 with a different square sector 502 being considered. The mean lightness of the pixels within square sector 502 is 174.05, and the standard deviation is 20.58. In accordance with the above threshold values, the square sector 502 has a wide lightness distribution and a low image quality print mode is recorded as being suitable for this square sector 502.

Once all of the square sectors have been considered for image 400, the required print modes that have been recorded for each square are evaluated by the software. The highest image quality print mode that has been recorded is then used for printing the image.

Assuming that all of the square sectors for image 400 have similar lightness distributions to those shown in square sectors 402 and 502, a low image quality print mode is selected as being appropriate for printing image 400. The entire image can be printed using a fast print mode (4 to 6 passes) while maintaining an acceptable level of image quality, and avoiding any banding or other image quality defects.

It will be appreciated that the software that performs the above analysis need not necessarily compute a histogram in order to determine the required statistics. A histogram is shown in the above examples for illustrative purposes. It will be appreciated that computer software can be adapted to compute the required statistical information from the raw data associated with the pixels within the square sector by any appropriate means.

It will be appreciated that the above analysis relates to printing on white media where a maximum value of luminosity corresponds with the colour of the media. It is the contrast between the inks printed onto the media and the media itself that causes banding, and other image quality defects, to be perceptible to a user. In other embodiments a histogram may be computed with a horizontal axis that corresponds to a range of likeness of the colours of the image with the colour of the medium. For example, if printing on blue paper, a square having predominantly blue pixels will be considered as not being susceptible to image quality defects. In such an example, the horizontal axis may be considered as a measure of "blue-ness".

In some embodiments, an image may be divided into sectors of any shape that covers the entire area of an image without leaving any gaps so that all pixels of an image are analysed when determining an optimal print mode. For example, the sectors could be rectangles, triangles or any other shape that tessellates.

In other embodiments, an image may be divided into sectors that are spaced apart, and do not necessarily cover the entire image. For example, gaps can be left between adjacent sectors that are small enough that banding, or another image quality defect, could not be perceived if they were to occur in a gap. Leaving gaps between sectors reduces the number of sectors that need to be analysed, which saves processing time and resource, and can allow a higher throughput of print jobs. In some embodiments the position of the gaps can be selected in regions of the image that are less important than other regions of the image. For example, the focal point of an image may have sectors that abut each other, and peripheral regions of the image may have sectors that are spaced apart.

In other embodiments, the image may be notionally divided into sectors that overlap, in order that some pixels are considered in more than one sector. In this way the method/software can determine the likeliness of an image quality defect occurring for a pixel (or group of pixels) when considered with neighbouring pixels on different sides. In some embodiments, an image may be notionally divided into overlapping sectors in important regions of the image, and divided into non-overlapping sectors in less important regions of the image.

It will be appreciated, that in some embodiments an image could be notionally divided into some sectors that overlap, and some that are spaced apart.

Advantages of embodiments of the present invention can include:
- allowing the user to obtain banding-free images without the requirement of finding the correct print mode;
- providing faster average printing speeds because "easy-to-print" images are performed in higher throughput print modes;
- avoiding the user having to waste time and money searching for the optimum print mode.

The invention claimed is:

1. A method of printing a document using one of a plurality of print modes, the method comprising:
  notionally dividing a digital image of the document into sectors;
  for each sector, comparing one or more properties of the luminosity of pixels within each sector with one or more threshold values;
  using said comparison of to determine whether each sector is likely to show an image defect if printed at a lower image quality print mode;
  selecting a print mode such that all sectors are determined not to be likely to show an image defect;
  printing the document using the selected print mode;
  wherein the plurality of print modes cause different numbers of passes of a printer head of a printer over a print medium on which the document is printed during a print operation.

2. A method of printing a document using one of a plurality of print modes, the method comprising:
  notionally dividing a digital image of the document into sectors;
  for each sector, comparing one or more properties of the luminosity of pixels within each sector with one or more threshold values;
  using said comparison of to determine whether each sector is likely to show an image defect if printed at a lower image quality print mode;
  selecting a print mode such that all sectors are determined not to be likely to show an image defect; and
  printing the document using the selected print mode;
  wherein a size of the sectors that the document is notionally divided into is selected to correspond with a size in the physical printout in which banding cannot be perceived by the human eye; and
  wherein the plurality of print modes to perform print operations with an associated plurality of different image qualities are configured to cause a printer head of the printer to perform different numbers of passes over a print medium on which the document is printed during a print operation.

3. The method according to claim 2, wherein the sectors are squares with sides with a length of less than, or equal to, 2 cm.

4. A printer system comprising
  a printer,
  a computer memory having a plurality of print modes stored thereon, and
  printer driver software;
  the system being configured such that the printer driver software is adapted to compare one or more properties of the luminosity of pixels within a document that is to be printed with one or more threshold values, and to select one of the plurality of print modes that is to be used to print the document based on the comparison;
  wherein the plurality of print modes to perform print operations with an associated plurality of different image qualities are configured to cause a printer head of the printer to perform different numbers of passes over a print medium on which the document is printed during a print operation.

5. A method of selecting a print mode for printing a document comprising:
  analysing properties of the luminosity of pixels within the document;
  comparing the analysis of the properties of the luminosity of the pixels with a threshold value; and
  selecting one of a plurality of print modes for printing the document based on the result of the comparison;
  wherein the plurality of print modes to perform print operations with an associated plurality of different image qualities are configured to cause a printer head of the printer to perform different numbers of passes over a print medium on which the document is printed during a print operation.

6. A method of printing a document using one of a plurality of print modes, the method comprising:
  notionally dividing the document into sectors;
  comparing one or more physical characteristics of pixels within each sector as they will appear in the printed document, with one or more threshold values;
  determining one of the plurality of print modes as being the minimum print quality suitable for printing that sector based on the comparison of the physical characteristics of pixels for that sector;
  determining the optimal print mode for the document based on the minimum print modes determined to be suitable for each sector; and
  printing the document using the determined optimal print mode;
  wherein the plurality of print modes cause different numbers of passes of a printer head of a printer over a print medium on which the document is printed during a print operation.

7. The method of claim 6, wherein a size of the sectors that the document is notionally divided into is selected to correspond with a size in the physical printout in which banding cannot be perceived by the human eye.

8. The method of claim 7, wherein the sectors are squares with sides with a length of less than, or equal to, 2 cm.

* * * * *